(12) United States Patent
Perin (10) Patent No.: US 7,128,358 B2
(45) Date of Patent: Oct. 31, 2006

(54) ADJUSTABLE COLLAPSIBLE SEAT ASSEMBLY

(75) Inventor: Douglas E. Perin, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/055,792

(22) Filed: Feb. 11, 2005

(65) Prior Publication Data

US 2006/0181113 A1   Aug. 17, 2006

(51) Int. Cl.
    *B60N 2/02* (2006.01)
(52) U.S. Cl. .................. 296/65.09; 297/15
(58) Field of Classification Search ............... 297/15, 297/335, 341, 334, 331, 243, 257, 248; 296/65.09, 296/65.05, 65.13, 65.16
See application file for complete search history.

(56) References Cited

U.S. PATENT DOCUMENTS

| | | | |
|---|---|---|---|
| 2,612,397 A | 9/1952 | Stutt | |
| 3,982,787 A | 9/1976 | Moll | |
| 4,922,170 A | 5/1990 | Kawasaki et al. | |
| 5,269,581 A | 12/1993 | Odagaki et al. | |
| 5,720,463 A | 2/1998 | Wisner et al. | |
| 5,868,450 A * | 2/1999 | Hashimoto | 296/65.09 |
| 5,954,398 A | 9/1999 | Namba et al. | |
| 6,626,481 B1 * | 9/2003 | Kawasaki | 296/65.05 |
| 6,629,721 B1 | 10/2003 | Macey | |
| 6,773,068 B1 * | 8/2004 | Shinozaki | 297/344.1 |
| 6,786,551 B1 | 9/2004 | Brewer et al. | |
| 6,793,265 B1 * | 9/2004 | Kamida et al. | 296/64 |
| 6,820,911 B1 * | 11/2004 | Furui | 296/65.01 |
| 6,848,286 B1 | 2/2005 | Dimig | |
| 6,848,727 B1 | 2/2005 | Cetnar et al. | |
| 6,869,138 B1 * | 3/2005 | Rhodes et al. | 297/15 |

* cited by examiner

*Primary Examiner*—Milton Nelson, Jr.
(74) *Attorney, Agent, or Firm*—Mark E. Duell, Esq.; Brouse McDowell (57) ABSTRACT

An adjustable vehicle seat assembly has an adjustable seat cushion and a foldable seat back. The adjustable vehicle seat assembly is pivotally mounted on the vehicle for rotation from an extended passenger carrying position to a storage position behind the passenger carrying position. The seat cushion is slidably mounted on a rail assembly having a pivotal connection to the vehicle at a position behind the passenger carrying position and a latch located at the forward portion of the seat cushion whereby the seat adjusting assembly is rotated with the folded seat cushion and seat back into the storage position after release of the latch.

12 Claims, 7 Drawing Sheets

ADJUSTABLE COLLAPSIBLE SEAT ASSEMBLY

I. BACKGROUND OF THE INVENTION

A. Field of Invention

This invention relates to seating and storage of adjustable seats in motor vehicles. More particularly, this invention is directed to SUV and minivan type vehicles having two or three rows of seating where it is desirable to adjust the seats in the forward and rearward directions and to fold the seats and store them in a recess or compartment behind the seating rows.

B. Description of the Related Art

SUV vehicles and minivan vehicles are well known to provide three rows of seats where the second and third rows (from the front of the vehicle) may be removed entirely or folded and stored in compartments behind the passenger carrying positions so as to provide more cargo area. Such known seats, however, are directly hinged to the vehicle floor and therefore are not adjustable in the forward or rearward directions. This has resulted in limited leg room for the passengers. Also, when one row of known seats are folded and stored, the row of seats that remained can not be moved forward to expand cargo room or rearward to expand leg room because no such adjustment of the seats is provided.

In U.S. Pat. No. 5,269,581, there is provided a collapsible seat pivotally mounted on the vehicle at the floor level whereby the seat back can be folded against the seat cushion and the folded seat assembly can then be angularly moved into a recess behind the seat position. Because the seat cushion is hinged to the floor it is not possible to provide for forward or backward adjustment of the seat.

In U.S. Pat. No. 5,954,398, there is provided a seating arrangement in which a rear seat cushion is foldable into a recess behind the front seat and the rear seat back is foldable over the rear seat cushion in the recess to provide cargo space behind the front seat. However, there is no teaching or showing of folding the seat back and seat cushion into the recess as a unit. There is also no teaching or showing of forward or backward adjustment of the seat.

In U.S. Pat. No. 6,629,721, individual seats for passengers are provided. Each seat is mounted on a linkage arrangement for lowering and raising the seat so that it can be reduced in height and can be placed into a stowed position. There is no provision for adjusting the seat forward or rearward in the passenger carrying position.

II. SUMMARY OF THE INVENTION

The present invention is directed to solving the problem of storing folded seats of a vehicle and at the same time providing for forward and rearward adjustment of the seats by the occupants in the extended position of the seats.

It is therefore an object of this invention to provide a retractable adjustable seat assembly for a vehicle comprising a seat cushion member mounted on a rail assembly and having a foldable seat back. The rail assembly is pivotally mounted on the vehicle for rotation about an axis extending transversely of the vehicle to provide for rotation of the seat cushion member with the seat back in the folded condition from a forward seating position to a rearward storage position. The rail assembly may include at least two parallel spaced apart rails extending in a direction from front to rear of the vehicle with the seat cushion member being in sliding engagement with the rails. The rail assembly may have a hinged connection with the vehicle at a position to the rear of the seating position and latch at the forward end of the rail assembly for retaining the seat cushion member in the seating position and for releasing the rail assembly to permit rotation of the seat cushion member and the rail assembly from the seating position to the storage position. This provides increased storage space in the vehicle when the seat is in the folded condition.

It is also an object of this invention to provide a foldable seat cushion wherein the rails on which the cushion is slidably mounted are mounted on a flat supporting member to which the rail assembly is fastened providing a flat uninterrupted floor surface in the retracted position of the seat assembly.

III. BRIEF DESCRIPTION OF THE DRAWINGS

The invention may take physical form in certain parts and arrangement of parts. A preferred embodiment of these parts will be described in detail in the specification and illustrated in the accompanying drawings, which form a part hereof and wherein.

IV. DESCRIPTION OF THE PREFERRED EMBODIMENT

Figures 1, 1A:
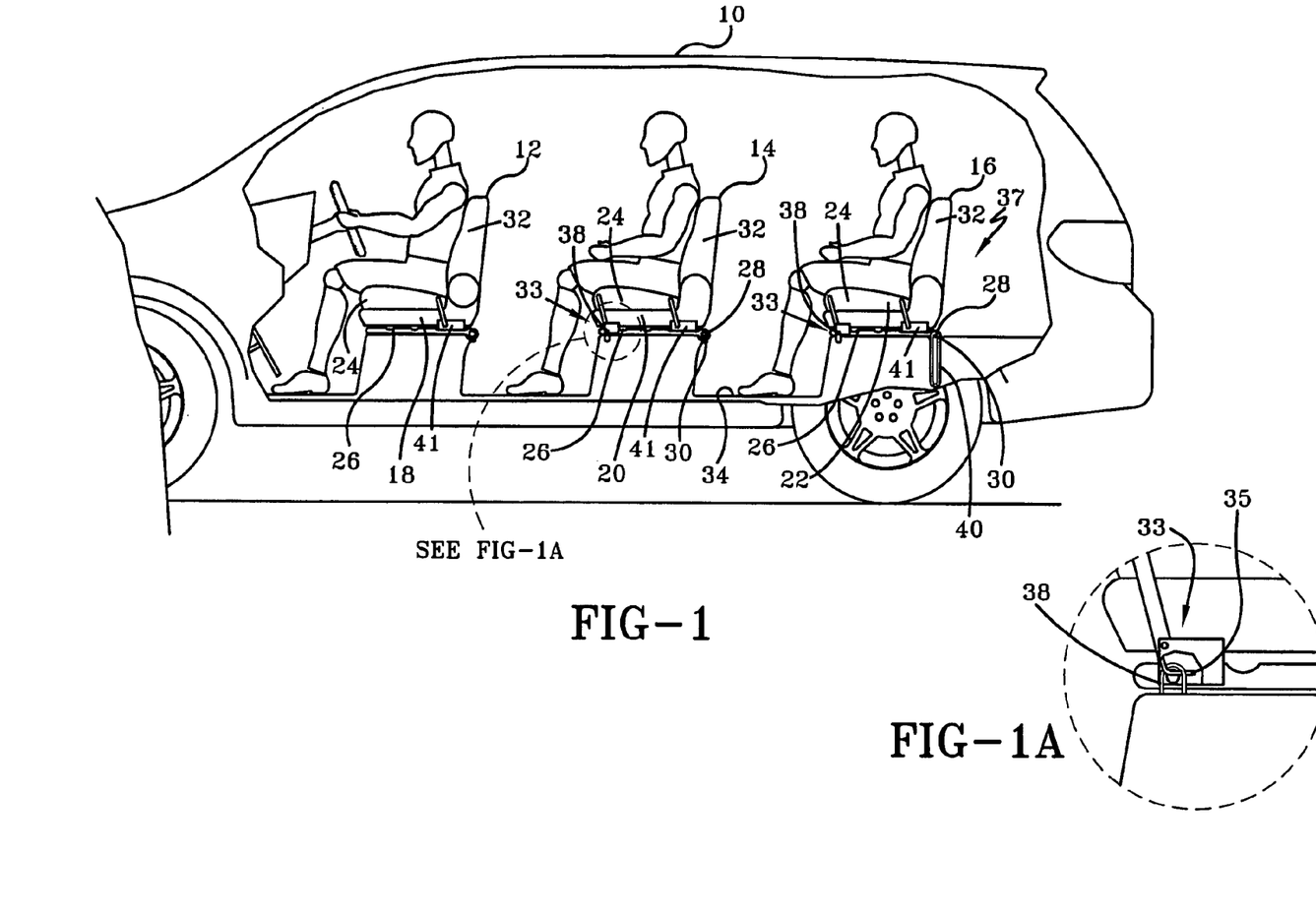
FIG. 1 is a schematic side view of an SUV type vehicle showing the seating embodying the invention with the second and third rows of seats occupied.
FIG. 1A is an exploded view of a portion of FIG. 1 showing the hook of the latch releasably attached to the striker.
Figure 2:
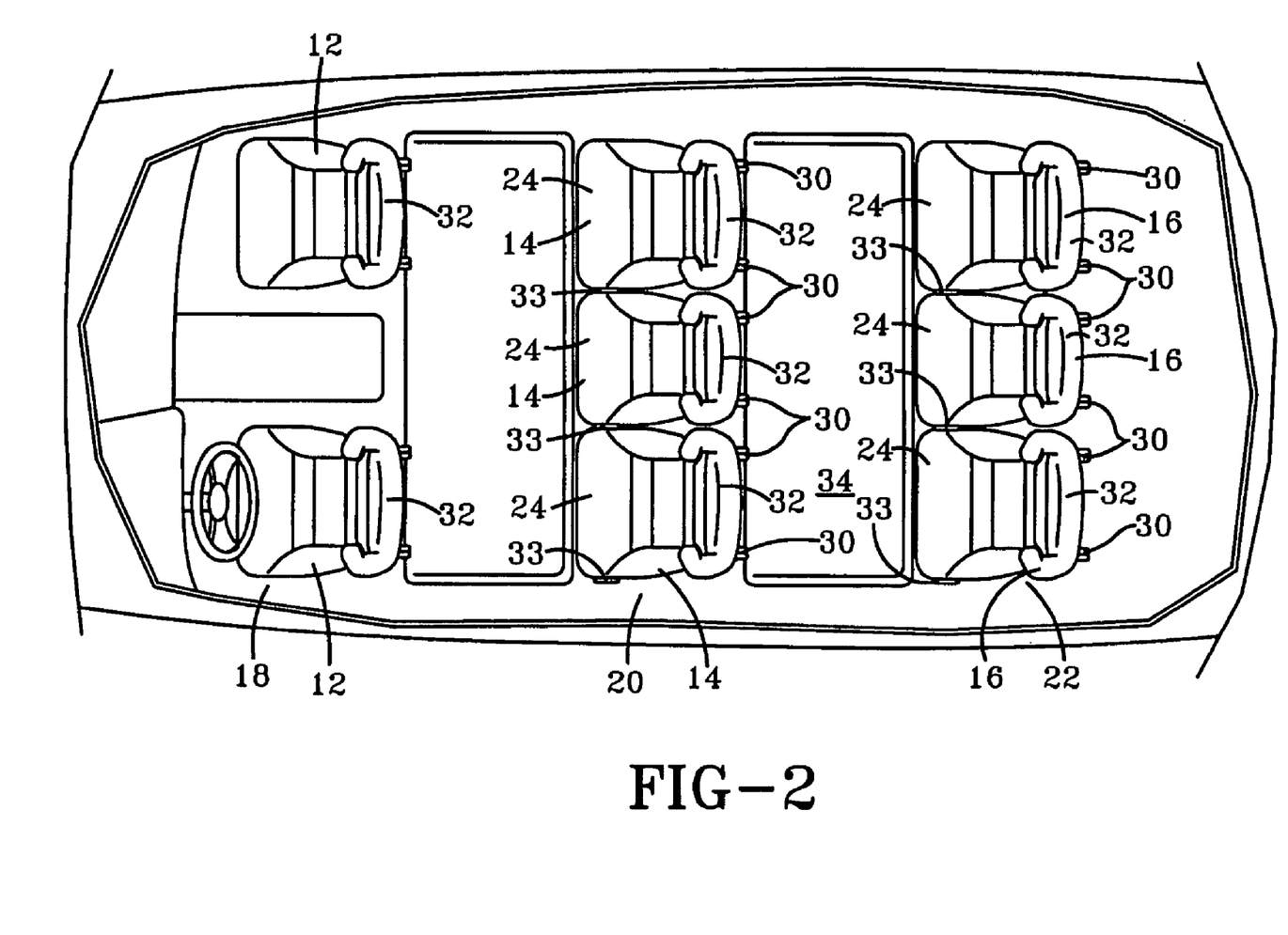
FIG. 2 is a plan view of the seats and floor of the vehicle in the condition shown in FIG. 1 except unoccupied.

Referring now to the drawings wherein the showings are for purposes of illustrating a preferred embodiment of the invention only and not for purposes of limiting the same, there is shown in FIGS. 1 and 2 schematic side and plan views of a vehicle 10 having seats 12, 14, and 16 positioned in a first row of seats 18, a second row of seats 20, and a third row of seats 22. Each of the seats in the second row 20 and third row 22 preferably has a seat cushion member 24 and a seat back member 32. A locking assembly 41 is adjustable to permit each of the seats to be slid on a rail assembly 26 having rails 28 extending lengthwise on the vehicle and having a hinged connection 30 to the vehicle 10. The rails 28 support rollers (not shown) or other suitable means for facilitating forward or rearward sliding movement of the seats. Preferably, each seat includes at least one latch 33, described further below, for retaining each seat in the adjusted upright position (as shown in FIG. 1).

Figure 3:
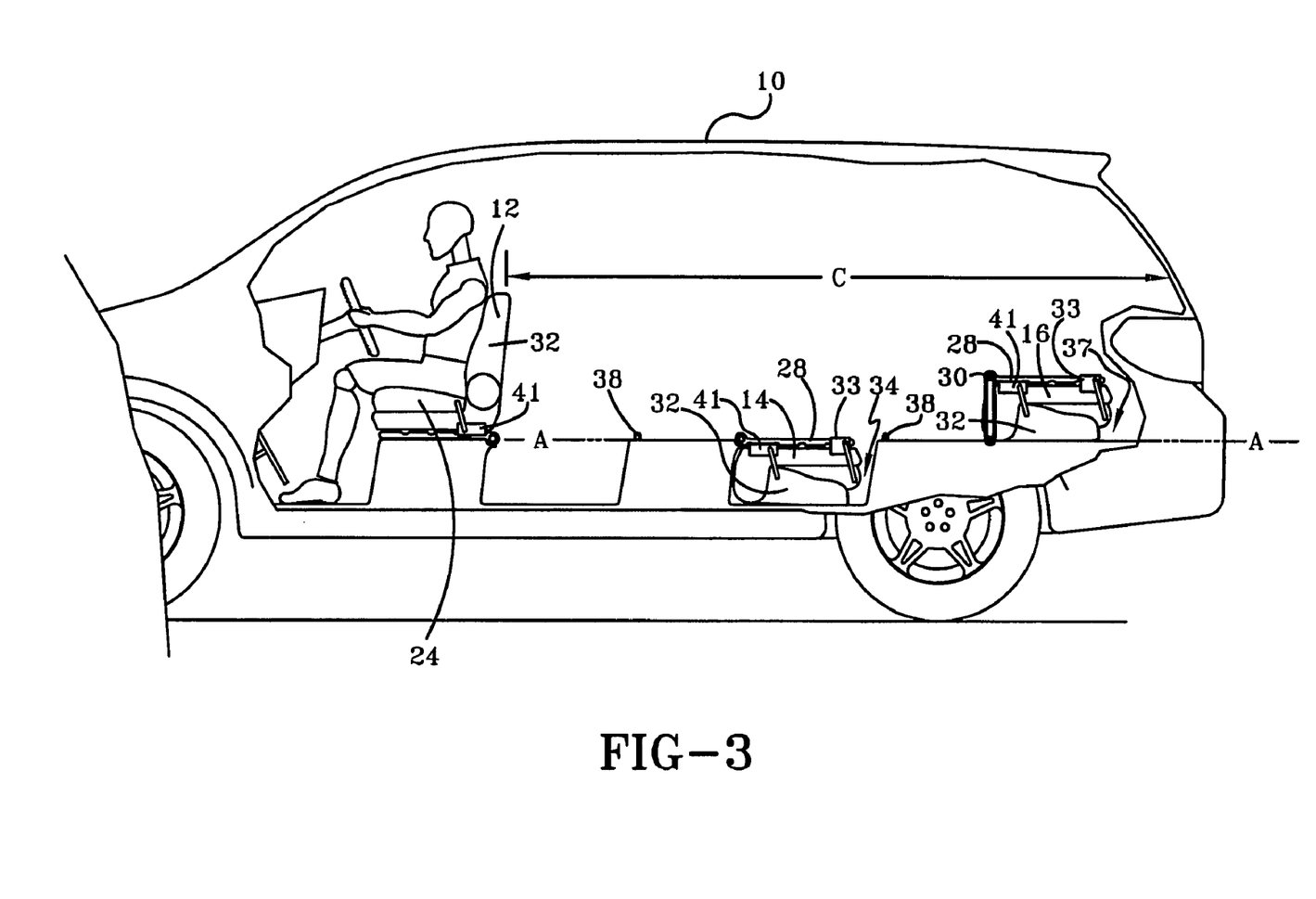
FIG. 3 is a side view like FIG. 1 showing the second and third rows of seats in the folded condition.

With reference to FIGS. 1 and 3, the hinged connection 30 is preferably offset below the rails 28 so that upon rotation of the folded seat cushion 24 and seat back member 32 the folded unit will be rotatable into a space 34 behind the second row 20 and a space 37 behind the third row 22. The folded second row seats will be received below the A—A level of the cargo area C as shown in FIG. 3. The folded third row seats 16 will be stored in a space 37 behind the third row 22.

Figure 4:
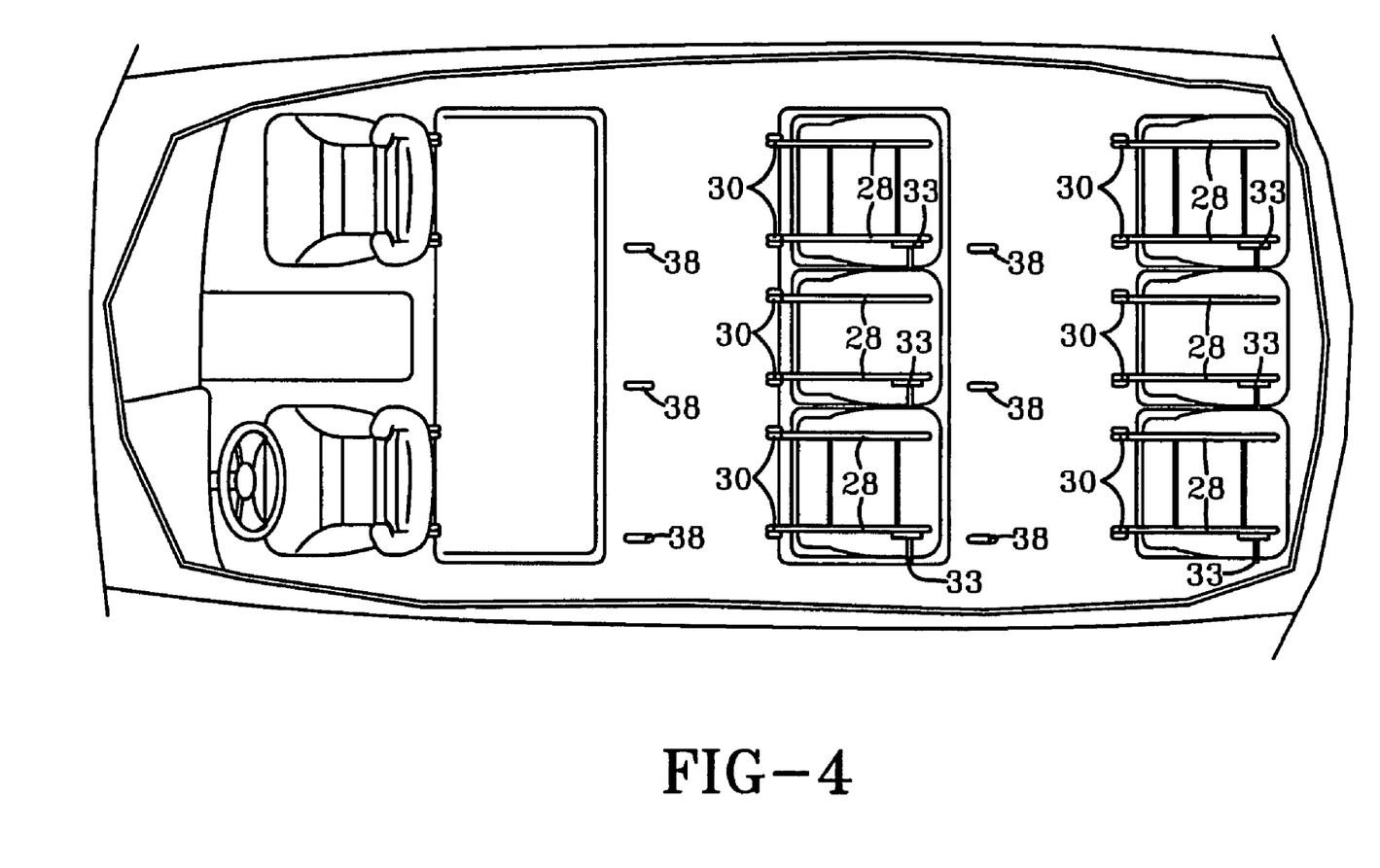
FIG. 4 is a plan view showing the seats in the second and third rows in the folded condition and rotated into the compartments behind the rows.

With reference now to FIGS. 1–4, each latch 33 retains the corresponding rail assembly 26 in place to hold the corresponding seat 14 or 16 in the upright condition during operation of the vehicle 10. Each latch 33 is also used to release the corresponding rail assembly 26 so that the corresponding seat 14 or 16 (after folding of the seat back 32 over the seat cushion member 24) maybe rotated to the corresponding space 34 or 37 behind the row of seats, as shown in FIGS. 3 and 4. In a preferred embodiment, each latch 33 includes a hook 35 that is releasably attached to a striker 38. The striker 38 may be mounted to the vehicle, as shown, for releasably receiving the latch 33. Preferably, the striker 38 is a wire loop, as seen best in FIG. 1A. In another embodiment, a pair of latches 33, 33 may be used at the front end, one on each side, of each rail assembly 26. In this case, a corresponding pair of strikers 38 would be mounted to the vehicle.

As shown in FIGS. 1 and 3 the hinge connection 30 to the third row of seats 22 may include an additional linkage member 40 connecting the hinge connection 30 to the vehicle in a manner which will permit the folded third row of seats 22 to be rotated into the space 37 behind the third row. The rail assembly 26 and hinged connection 30 are in a spaced apart relationship when the rail assembly 26 and seat cushion member are in the second storage position, shown in FIGS. 3 and 4. Preferably the linkage member 40 forms a coupling between the rail assembly 26 and the hinged connection 30.

In operation, the vehicle 10 may be operated with all three rows of seats 18, 20, and 22 in the upright condition as shown in FIGS. 1 and 2. Cargo carrying capacity may be provided by folding and storing the seats 14 and 16 of the second and third rows 20 and 22 either individually or separately. Referring to FIGS. 3 and 4, all of the seats 14 and 16 of the second and third rows 22 and 24 have been folded and stored in the spaces 34 behind the second row 20 and the space 37 behind the third row 22. With the offset hinge connection 30 of the second row seats 14 to the vehicle the folded seats and rail assemblies 26 will be stored in a position flush with the floor level A—A as shown in FIG. 3.

It should be understood that the rail assembly 26 and rails 27 may be part of another seat adjusting apparatus known to those skilled in the art, including motorized seat adjusters. This would include the hinge connection 30 which is offset below the level of the rails to provide the rotation of the seats into the space behind the seat positions.

Figure 5:
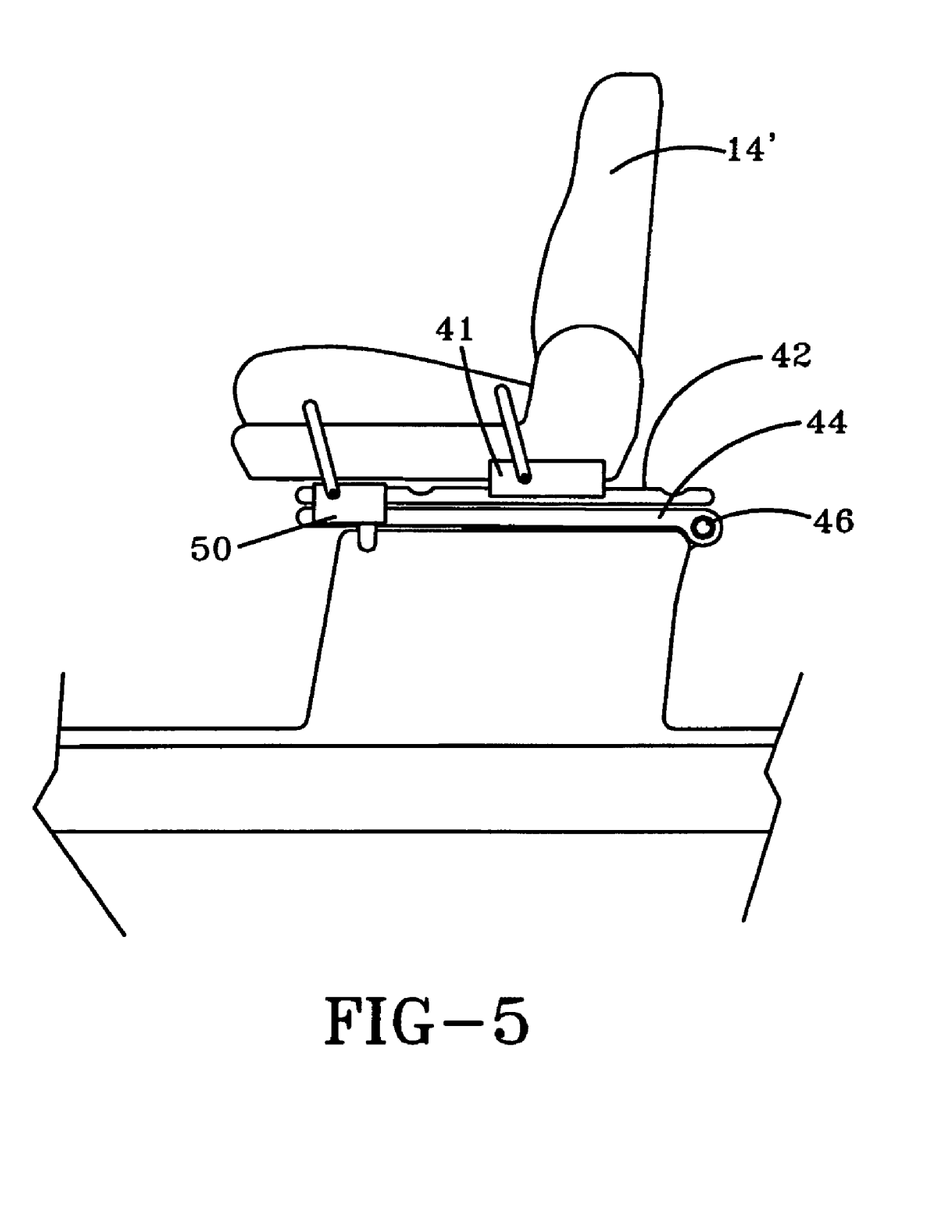
FIG. 5 is a fragmentary side view like FIG. 1 showing a modification of one of the second row of seats embodying the invention mounted on a floor cover member.
Figure 6:
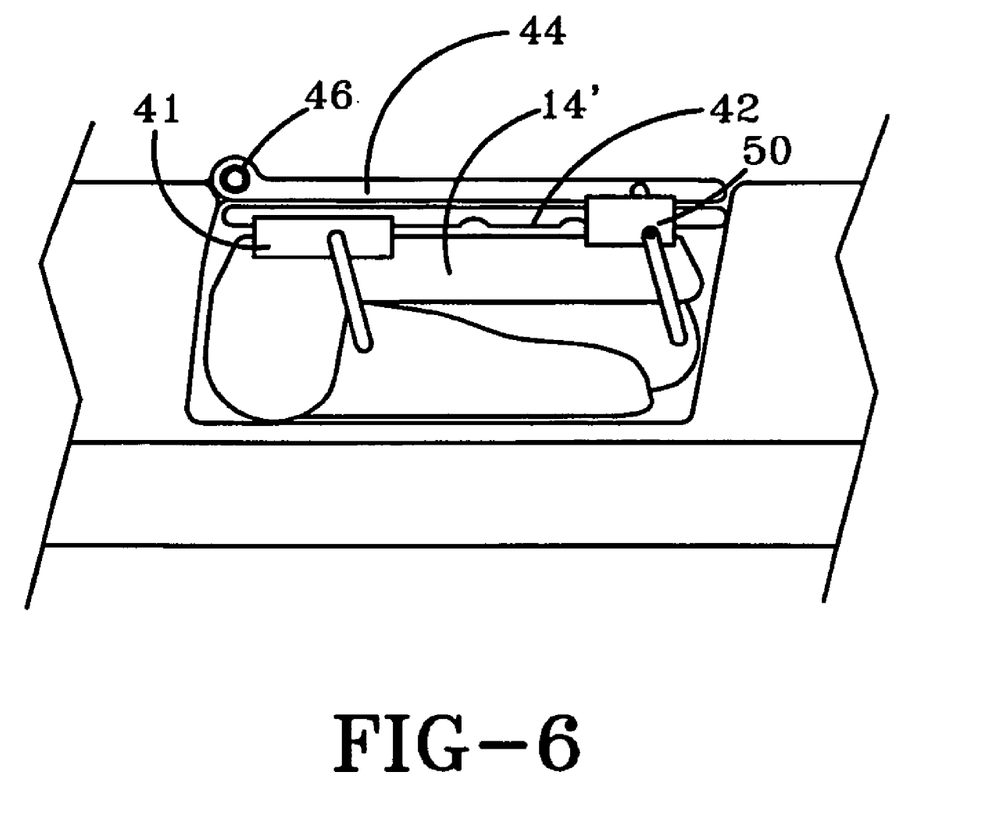
FIG. 6 is a fragmentary side view of the seat and floor cover member shown in FIG. 5 in the retracted position with the floor cover member in place.
Figure 7:
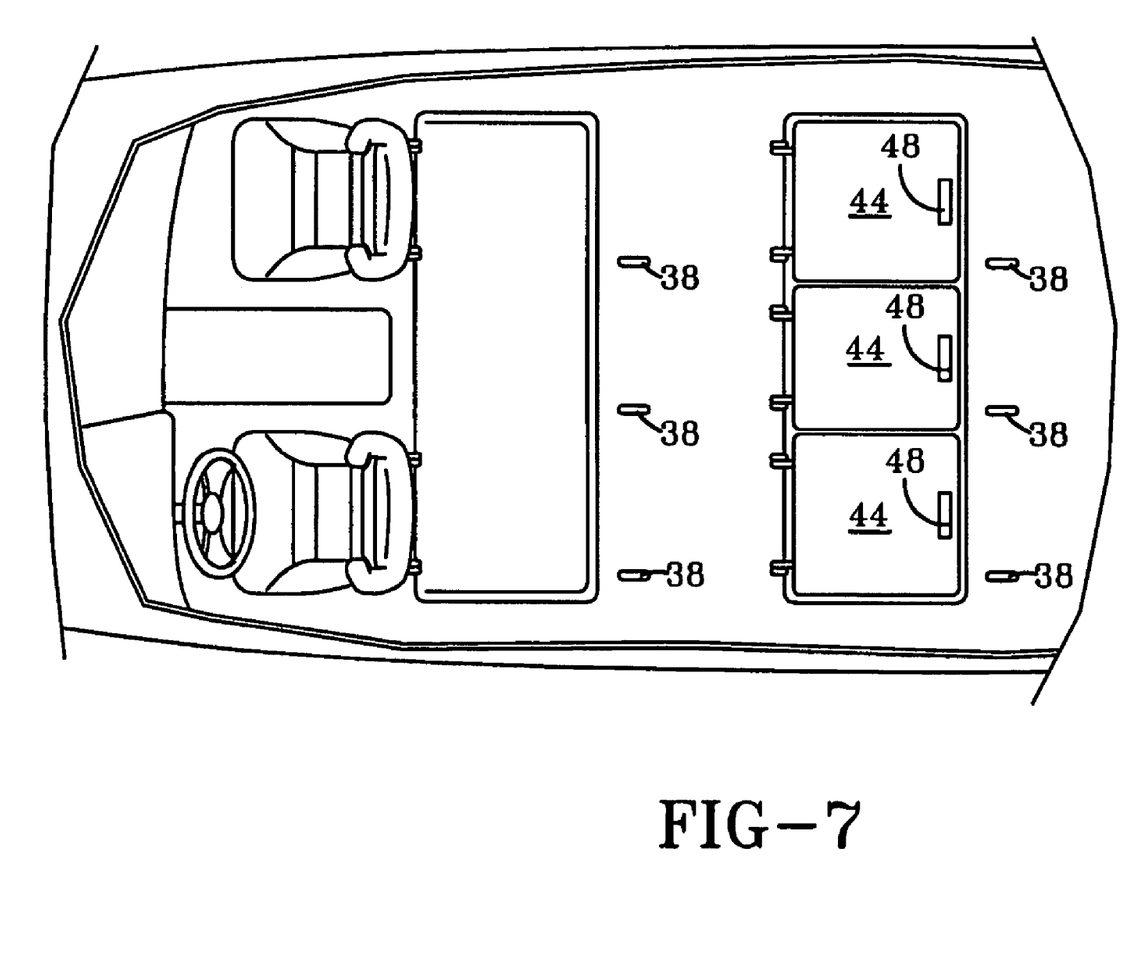
FIG. 7 is a fragmentary plan view of the seat and floor cover member shown in FIG. 6 in the retracted position.

Referring now to FIGS. 5, 6, and 7, a modification of the invention is shown wherein a second row seat 14' has a rail assembly 42 mounted on a platform 44 which has an offset hinge connection 46 to the vehicle. When the second row 20 of seats 14' is folded into the space behind the second row 34, the platform 44 will close this space and provide a floor for carrying cargo and also cover the seats 14' so that they will be protected from damage and dirt. An opening or handle 48 in each of the platforms 44 may be provided for lifting each of the seats 14'. The seats 14' also may have latches 50 for holding the platforms 44 in place with the seats 14' in an upright position and for releasing the seats 14' so that they may be rotated in the folded condition with the platforms 44 into the cargo carrying position shown in FIGS. 6 and 7.

While the invention has been described in the specification and illustrated in the drawings with reference to preferred embodiments it will be understood by those skilled in the art that various changes may be made and equivalents may be substituted for elements thereof without departing from the scope of the invention as defined in the claims. In addition, modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention but that the invention will include any embodiments falling within the description of the appended claims.

I claim:

1. A vehicle comprising:
   a cargo area comprising:
   (a) a first floor surface having a first surface level;
   (b) a second floor surface in front of the first floor surface defining a passenger lower leg reception area, the second floor surface having a second surface level below the first surface level; and,
   (c) a third floor surface behind the first floor surface defining a storage area, the third floor surface having a second surface level below the first surface level; and,
   a first adjustable seat assembly comprising:
   (a) a rail assembly pivotally mounted to the first floor surface with a hinged connection;
   (b) a seat mounted to the rail assembly and having a seat cushion member and a seat back member selectively foldably attached to the seat cushion member, wherein the seat is selectively adjustable between an upright position and a storage position;
   (c) wherein the seat cushion is selectively slidable along the rail assembly for use in adjusting the available leg room in the passenger lower leg reception area; and,
   (d) wherein the seat and rail assembly are selectively pivotable about the hinged connection into the storage position within the storage area wherein the seat cushion, seat back member, and rail assembly are all positioned level with or below the first surface level.

2. The vehicle of claim 1 wherein the first adjustable seat assembly further comprises:
   a first latch for retaining the rail assembly and the seat in the upright position and for releasing the rail assembly to permit the rail assembly and seat to be pivoted from the upright position to the storage position.

3. The vehicle of claim 2 wherein the first adjustable seat assembly further comprises:
   a second latch for retaining the rail assembly and the seat in the upright position and for releasing the rail assembly to permit the rail assembly and seat to be pivoted from the upright position to the storage position.

4. The vehicle of claim 2 wherein the first adjustable seat assembly further comprises:
   a striker mounted to the first floor surface of the vehicle for releasably receiving the first latch.

5. The vehicle of claim 4 wherein the striker is a wire loop.

6. The vehicle of claim 1 wherein the first adjustable seat assembly further comprises:
- a releasable locking assembly operable for selectively adjusting the seat cushion member along the rail assembly in a forward and rearward direction along the length of the vehicle.

7. The vehicle of claim 1 wherein the hinged connection is offset below the rail assembly.

8. The vehicle of claim 1 wherein the hinged connection is positioned at the back of the first floor surface.

9. The vehicle of claim 1 wherein the vehicle is a SUV.

10. The vehicle of claim 1 further comprising:
- a second adjustable seat assembly positioned beside the first adjustable seat assembly, the second adjustable seat assembly comprising:
  - (a) a rail assembly pivotally mounted to the first floor surface with a hinged connection;
  - (b) a seat mounted to the rail assembly and having a seat cushion member and a seat back member selectively foldably attached to the seat cushion member, wherein the seat is selectively adjustable between an upright position and a storage position;
  - (c) wherein the seat cushion is selectively slidable along the rail assembly for use in adjusting the available leg room in the passenger lower leg reception area; and,
  - (d) wherein the seat and rail assembly are selectively pivotable about the hinged connection into the storage position within the storage area wherein the seat cushion, seat back member, and rail assembly are all positioned level with or below the first surface level.

11. The vehicle of claim 1 further comprising:
- a fourth floor surface behind the third floor surface, the fourth floor surface having a fourth surface level substantially equal to the first surface level; and,
- a second adjustable seat assembly positioned behind the first adjustable seat assembly, the second adjustable seat assembly comprising:
  - (a) a rail assembly pivotally mounted to the fourth floor surface with a hinged connection;
  - (b) a seat mounted to the rail assembly and having a seat cushion member and a seat back member selectively foldably attached to the seat cushion member, wherein the seat is selectively adjustable between an upright position and a storage position;
  - (c) wherein the storage area defines a passenger lower leg reception area with respect to the second adjustable seat assembly; and,
  - (d) wherein the seat cushion is selectively slidable along the rail assembly for use in adjusting the available leg room in the storage area.

12. The vehicle of claim 11 further comprising:
- a fifth floor surface behind the fourth floor surface, the fifth floor surface having a fifth surface level substantially equal to the fourth surface level; and,
- wherein the seat and rail assembly of the second adjustable seat assembly are selectively pivotable about the hinged connection into the storage position upon the fifth floor surface.

* * * * *